US000001547H

United States Statutory Invention Registration [19]

[11] Reg. Number: H1547

Tsuji

[45] Published: Jun. 4, 1996

[54] SILVER HALIDE PHOTOGRAPHIC LIGHT-SENSITIVE MATERIAL FOR LASER-BEAM-SCANNING USE

[75] Inventor: Nobuaki Tsuji, Hino, Japan

[73] Assignee: Konica Corporation, Hino, Japan

[21] Appl. No.: 378,934

[22] Filed: Jan. 26, 1995

Related U.S. Application Data

[63] Continuation of Ser. No. 125,696, Sep. 24, 1993, abandoned.

[30] Foreign Application Priority Data

Oct. 15, 1992 [JP] Japan ..... 4-277369

[51] Int. Cl.[6] ..... G03C 1/76

[52] U.S. Cl. ..... 430/531; 430/533; 430/571; 430/634

[58] Field of Search ..... 430/531, 533, 430/571, 634

[56] References Cited

U.S. PATENT DOCUMENTS

| | | | |
|---|---|---|---|
| 2,592,250 | 4/1952 | Davey et al. | 430/569 |
| 3,505,068 | 4/1970 | Beckett et al. | 430/567 |
| 3,574,628 | 4/1971 | Jones | 430/569 |
| 3,655,394 | 4/1972 | Illingsworth | 430/569 |
| 4,210,450 | 7/1980 | Corben | 430/567 |
| 4,444,877 | 4/1984 | Koitabashi et al. | 430/567 |
| 4,521,507 | 6/1985 | Iijima et al. | 430/571 |
| 4,945,036 | 7/1990 | Arai et al. | 430/571 |
| 4,957,849 | 9/1990 | Inoue et al. | 430/567 |
| 5,185,240 | 2/1993 | Miyata et al. | 430/596 |
| 5,190,855 | 3/1993 | Toya et al. | 430/599 |
| 5,198,327 | 3/1993 | Yamada et al. | 430/963 |
| 5,230,994 | 7/1993 | Yamada et al. | 430/963 |
| 5,272,046 | 12/1993 | Sasaoka | 430/963 |

FOREIGN PATENT DOCUMENTS 3710625 10/1987 Germany .

OTHER PUBLICATIONS

Research Disclosure 308119 Section XVI, pp. 1008–1009, Dec. 1989.

Database WPI, Week 8430, Derwent Publications Ltd., London, GB, AN 84184593 for JP–A–59 102 229, Jun. 13, 1984 (Abstract).

*Primary Examiner*—Charles T. Jordan
*Assistant Examiner*—John R. Hardee
*Attorney, Agent, or Firm*—Finnegan, Henderson, Farabow, Garrett & Dunner

[57] ABSTRACT

Disclosed is a silver halide photographic light-sensitive material for laser beam scanning use, comprising a support and a silver halide emulsion layer on one side of said support, which layer having a silver coating weight of not more than 3.5 g/m$^2$, and at least one polymer matting agent on the one side of the silver halide emulsion layer, wherein the silver halide emulsion layer comprises chemically unripened silver halide grains having an average grain diameter of 0.8 μm to 2.0 μm and chemically ripened silver halide grains having an average grain diameter of 0.1 μm to 0.6 μm in a ratio of 30:70 to 5:95.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE PHOTOGRAPHIC LIGHT-SENSITIVE MATERIAL FOR LASER-BEAM-SCANNING USE

This application is a continuation of application Ser. No. 08/125,696 filed Sep. 24, 1993, now abandoned.

FIELD OF THE INVENTION

The present invention relates to a silver halide photographic light-sensitive material for laser-beam-scanning use, whose aptitude for the medical diagnosis is improved by reducing the surface gloss of its processed image.

BACKGROUND OF THE INVENTION

It has lately been prevailing to provide transmission-type images for medical diagnoses in accordance with methods in which radiographic image information for diagnoses recorded by MRI (magnetic resonance imaging), CT '(computed tomography) and CR (computed radiography) or for computer-assisted diagnoses are fed in the form of digital or analog (video) signals and processed in a processor, such as a computer, and a processed output is imagewise reproduced by laser beam scanning on a silver halide photographic light-sensitive material.

As the above silver halide photographic light-sensitive material a film for laser printer is used which is spectrally sensitized to the spectral wavelength range from red to near infrared, corresponding to the laser light emission wavelength range. In order to make the above film meet recent requirements for rapid processing, attempts have been made to make its silver halide grains much finer or to improve it for silver-saving.

Making silver halide grains much finer or silver-saving raises the film's processability, but on the other hand results in increasing the surface gloss of the film, thus inviting demerits to make it difficult to read characters recorded on the film.

It is conventionally known that inorganic materials such as silica and polymer beads are used in order to restrain the surface gloss of a light-sensitive material, but there is a problem that the use of such materials degrades the transparency of the light-sensitive material after being processed, so that some measures otherwise have been called for.

SUMMARY OF THE INVENTION

It is therefore an object of the invention to provide a silver halide photographic light-sensitive material, a film for laser-beam-scanning use, which is improved so as to facilitate correct diagnoses by getting rid of the surface gloss of it after being processed without degrading its transparency for better character legibility.

The above object of the invention is accomplished by a silver halide photographic light-sensitive material for laser-beam-scanning use, being a single-sided light-sensitive material comprising a support having on one side thereof a silver halide emulsion layer having a silver coated weight of not more than 3.5 g/m$^2$, in which the silver halide emulsion layer comprises chemically unripened silver halide grains having an average grain diameter of 0.8 to 2.0 μm and chemically ripened silver halide grains having an average grain diameter of 0.1 to 0.6 μm in a ratio by weight of 30:70 to 5:95, and which comprises at least one polymer matting agent on the emulsion side thereof.

DETAILED DESCRIPTION OF THE INVENTION

The chemically unripened silver halide grains of the invention implies silver halide grains that have been subjected to physical ripening treatment alone for grain formation; i.e., generally, second ripening (chemical ripening)-omitted silver halide grains after removing the excessive salt therefrom. In the invention, the silver halide grains comprise chemically unripened grains having an average grain diameter of preferably 0.8 to 2.0 μm, more preferably 0.9 to 1.2 μm, and chemically ripened grains having an average grain diameter of preferably 0.1 to 0.6 μm, more preferably 0.15 to 0.40 μm, in a proportion by weight of preferably 30:70 to 5:95 and more preferably 20:80 to 5:95.

The light-sensitive material of the invention is a single-sided light-sensitive material with a light-sensitive silver halide emulsion coated on one side alone of its support, and the whole silver coated weight of the light-sensitive material is preferably not more than 3.5 g/m$^2$, more preferably 2.0 to 3.3 g/m$^2$.

Further, the single-sided light-sensitive material contains a polymer matting agent on the emulsion layer side of its support. The polymer matting agent herein is one not specially limited but an organic matting agent such as polyacrylate, polymethyl methacrylate, cellulose acetate-propionate and polystyrene.

The polymer matting agent is preferably contained in an amount of 10 to 100mg/m$^2$ on the emulsion side of the silver halide photographic light-sensitive material of the invention. The matting agent may be contained in any one of the emulsion layer, non-emulsion hydrophilic layer, protective layer and the like on the emulsion side of the light-sensitive material, but is most preferably contained in the protective layer located on the emulsion layer.

The matting agent of the invention may be used in combination with an inorganic matting agent such as silica, i.e., silicon dioxide, a noninventive matting agent.

The silver halide photographic light-sensitive material for laser-beam-scanning use of the invention is spectrally sensitized to the wavelength region of 600nm and upwards corresponding to the laser light emission wavelength region. The spectral sensitization of the light-sensitive material may be carried out according to any one of those known methods therefor, more preferably by using those spectrally sensitizing dyes represented by the Formulas 1, 2 and 3 described in JP Application No. 84132/1992, applied for by the same applicant as that of the present invention.

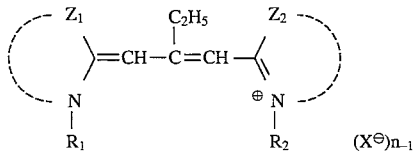

Formula 1 wherein $Z_1$ and $Z_2$ each represent a group of non-metallic atoms necessary to form an azole ring which may have a substituent; $R_1$ and $R_2$ each represent an alkyl group or a substituted alkyl group; $X^-$ is a counter ion; and n is an integer of 1 or 2, provided it is 1 when an intramolecular salt is formed.

Formula 2

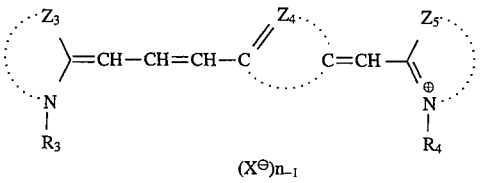

wherein $Z_3$ and $Z_5$ each represent a group of non-metallic atoms necessary to form a benzothiazole ring, a naphthothiazole ring, a benzoxazole ring or a naphthoxazole ring which each may have a substituent; $Z_4$ represents a moiety accessary to form a 5- or 6-member carbocyclic ring which may have a substituent; $R_3$ and $R_4$ each represent an alkyl group or a substituted alkyl group; $X^-$ is a counter ion; and n is an integer of 1 or 2, provided it is 1 when an intramolecular salt is formed.

Formula 3

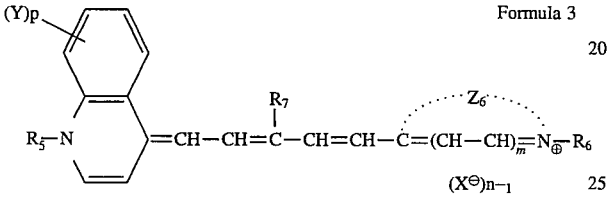

wherein $R_5$ and $R_6$ each represent an alkyl group or a substituted alkyl group; $R_7$ is a hydrogen atom, an alkyl group, an alkoxy group, a phenyl group or a benzyl group; Y is a hydrogen atom, an alkyl group having 1 to 8 carbon atoms, an alkoxy group or a halogen atom; $Z_6$ represents a moiety necessary to form a 5- or 6-member nitrogen-containing heterocyclic group; $X_-$ is a counter ion; and m, n and p each are an integer of 1 or 2.

The following are examples of the compounds represented by the above Formulas 1, 2 and 3, but the invention is not restricted by the examples.

1-1

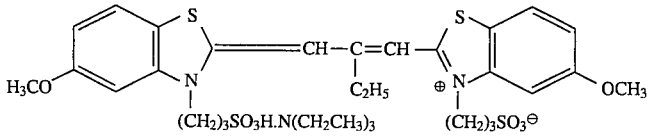

1-2

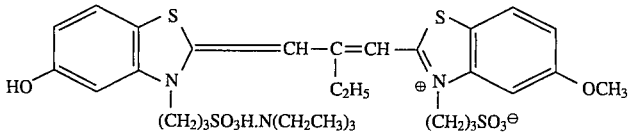

1-3

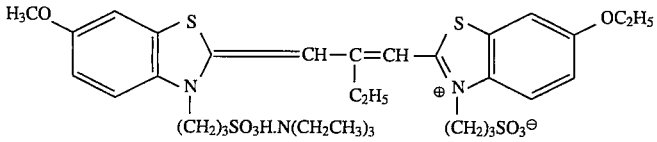

1-4

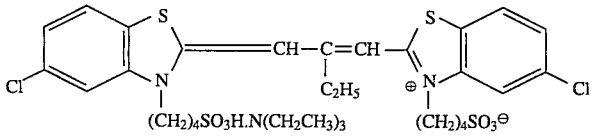

1-5

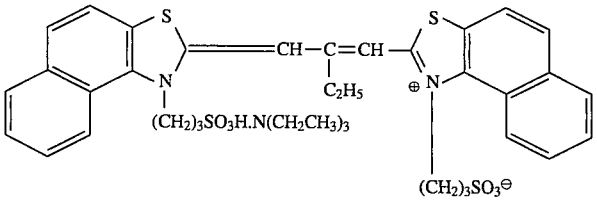

2-1

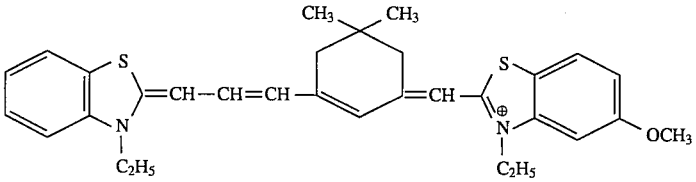

-continued
2-2
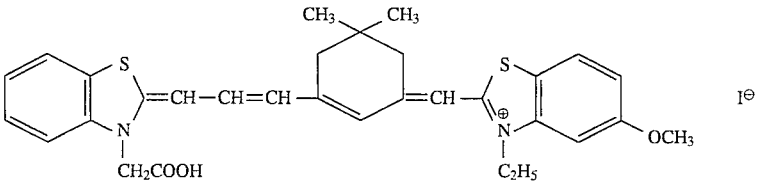
2-3
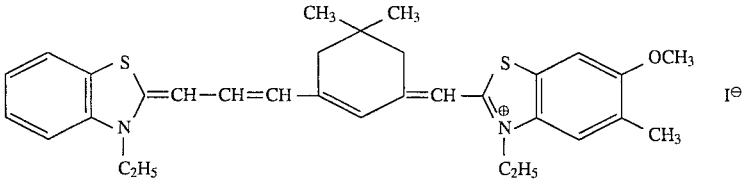
2-4
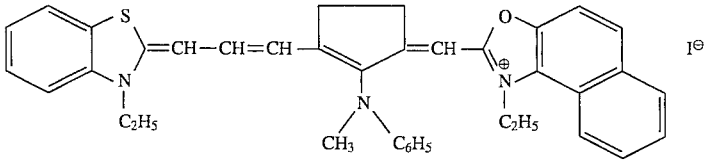
2-5
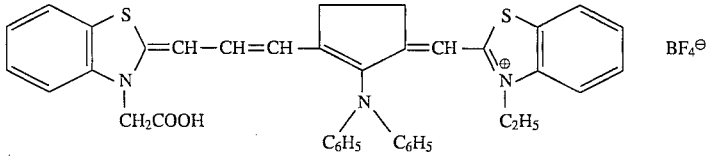
3-1
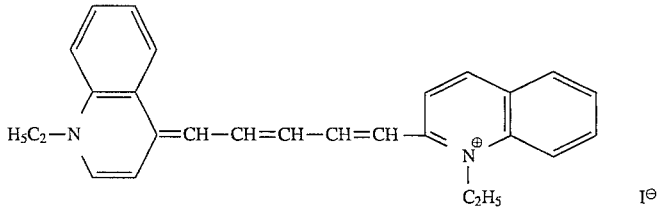
3-2
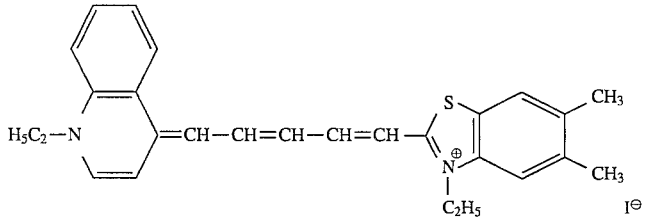
3-3
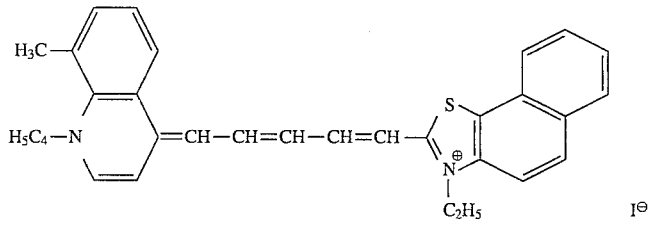
3-4
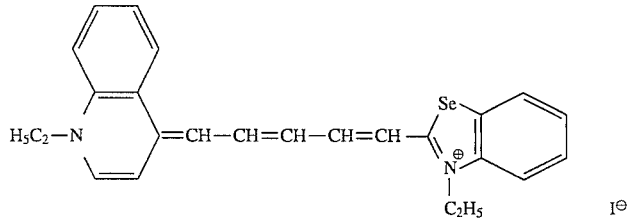

-continued 3-5

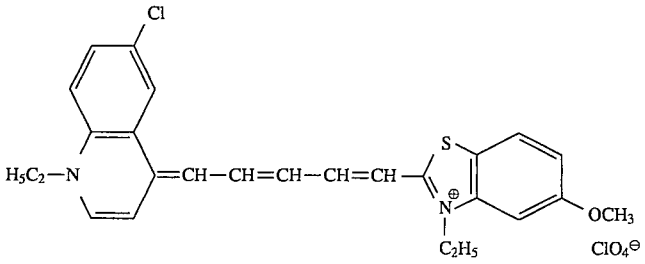

The silver halide photographic light-sensitive material of the invention may have an antistatic layer comprising (1) the water-soluble conductive polymer, (2) the hydrophobic polymer and (3) the reaction product of the hardening agent that are all described in JP O.P.I. No. 80744/1992, applied for by the applicant of the present invention.

The following are exemplified compounds of (1) the water-soluble conductive polymer.

P 1

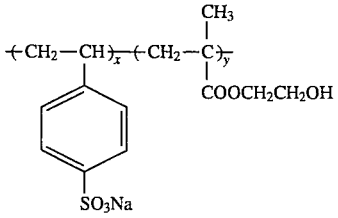

x:y = 70:30
$\overline{M} \approx 10{,}000$

P 2

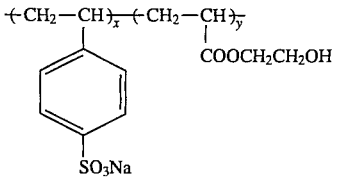

x:y = 70:30
$\overline{M} \approx 5000$

P 3

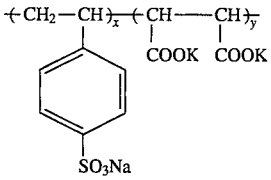

x:y = 50:50
$\overline{M} \approx 6000$

P 4

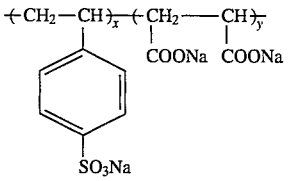

x:y = 65:35
$\overline{M} \approx 120{,}000$

P 5

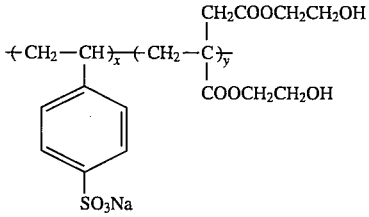

x:y = 98:2
$\overline{M} \approx 200{,}000$

-continued

P 6

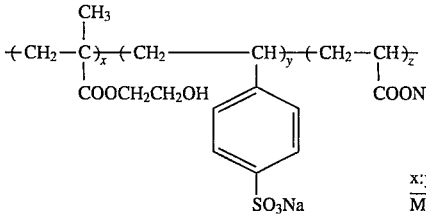

x:y:z = 40:30:1
$\overline{M} \approx 750{,}000$

P 7

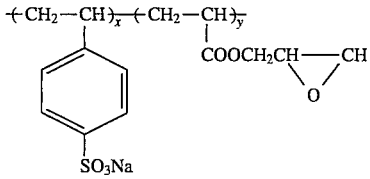

x:y = 70:30
$\overline{M} \approx 20{,}000$

P 8

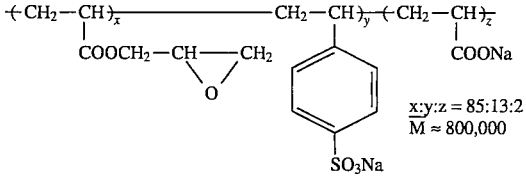

x:y:z = 85:13:2
$\overline{M} \approx 800{,}000$

P 9

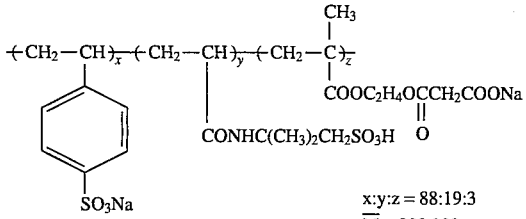

x:y:z = 88:19:3
$\overline{M} \approx 900{,}000$

P 10

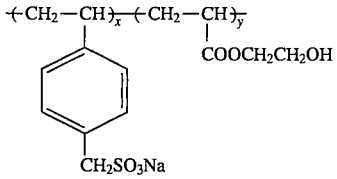

x:y = 80:20
$\overline{M} \approx 1{,}000{,}000$

P 11

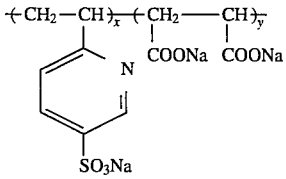

x:y = 80:20
$\overline{M} \approx 10{,}000$

P 12

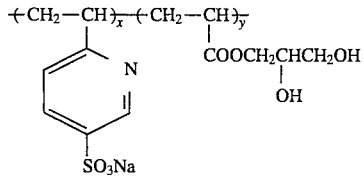

x:y = 70:30
$\overline{M} \approx 700{,}000$

-continued

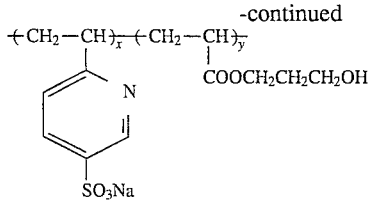

P 13 x:y = 70:30
$\overline{M} \approx 20{,}000$

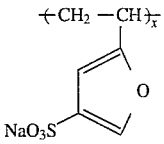

P 14

$\overline{M} \approx 200{,}000$

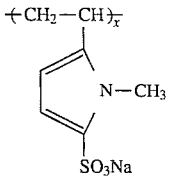

P 15

$\overline{M} \approx 200{,}000$

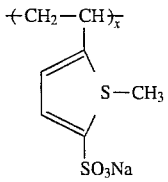

P 16

$\overline{M} \approx 150{,}000$

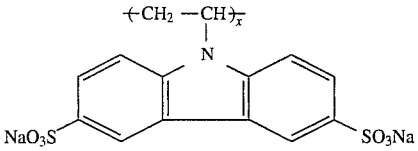

P 17

$\overline{M} \approx 300{,}000$

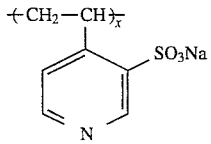

P 18

$\overline{M} \approx 280{,}000$

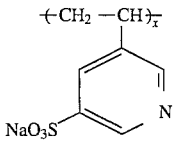

P 19

$\overline{M} \approx 450{,}000$

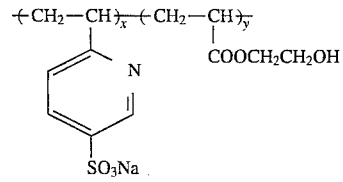

P 20 x:y = 60:40
$\overline{M} \approx 800{,}000$

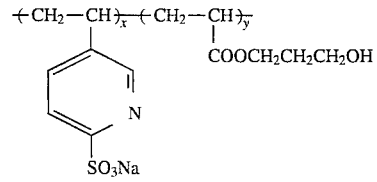

P 21 x:y = 70:30
$\overline{M} \approx 650{,}000$

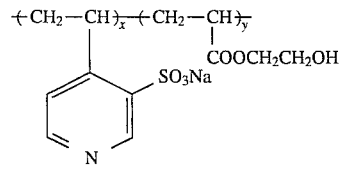

P 22 x:y = 80:20
$\overline{M} \approx 500{,}000$

-continued

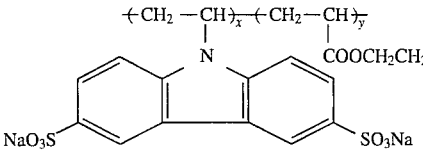

P 23 x:y = 75:25
$\overline{M} \approx 400{,}000$

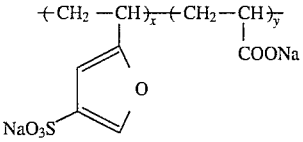

P 24 x:y = 80:20
$\overline{M} \approx 600{,}000$

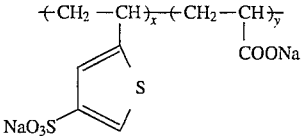

P 25 x:y = 90:10
$\overline{M} \approx 400{,}000$

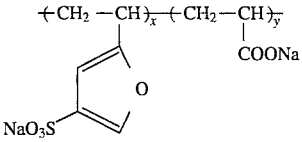

P 26 x:y = 55:45
$\overline{M} \approx 320{,}000$

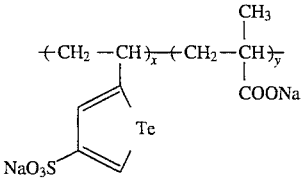

P 27 x:y = 90:10
$\overline{M} \approx 600{,}000$

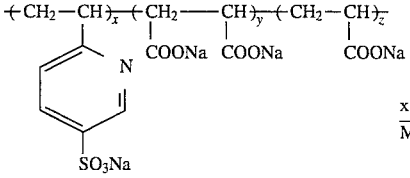

P 28 x:y:z = 80:10:10
$\overline{M} \approx 800{,}000$

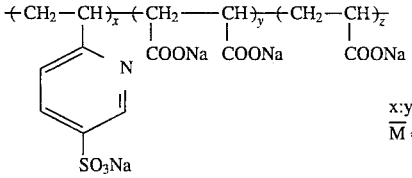

P 29 x:y = 70:30
$\overline{M} \approx 10{,}000$

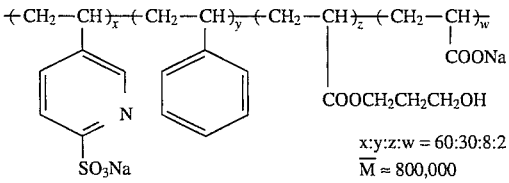

P 30 x:y:z:w = 60:30:8:2
$\overline{M} \approx 800{,}000$

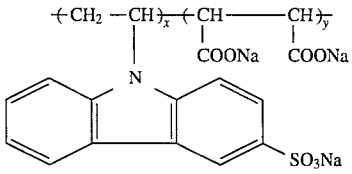

P 31 x:y = 60:40
$\overline{M} \approx 30{,}000$

-continued

P 32

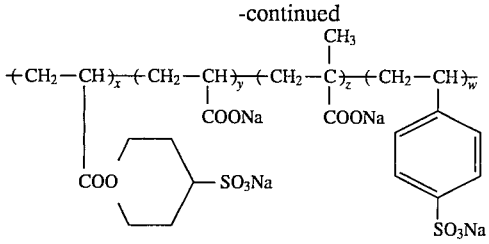

x:y:z:w = 40:30:20:10
$\overline{M} \approx 500{,}000$

P 33

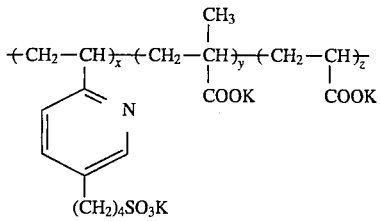

x:y:z = 60:30:10
$\overline{M} \approx 300{,}000$

P 34

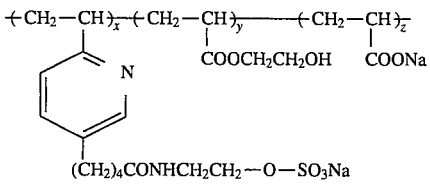

x:y:z = 40:30:30
$\overline{M} \approx 500{,}000$

P 35

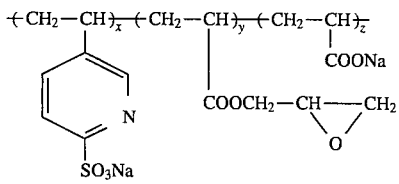

x:y:z = 55:35:10
$\overline{M} \approx 300{,}000$

P 36

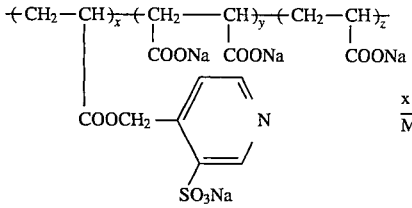

x:y:z = 50:30:20
$\overline{M} \approx 600{,}000$

P 37

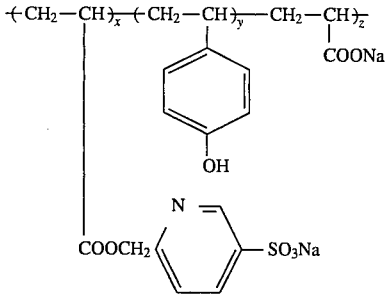

x:y:z = 60:30:10
$\overline{M} \approx 600{,}000$

The following are exemplified compounds of (2) the hydrophobic polymer.

HP1

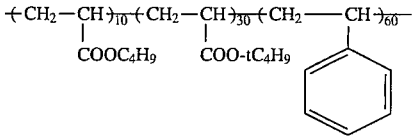

$\overline{M} = 100{,}000$

HP2

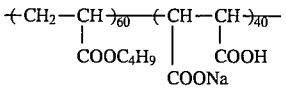

$\overline{M} = 200{,}000$

HP3

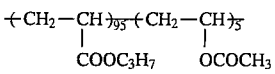

$\overline{M} = 300{,}000$

HP4

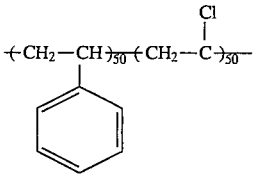

HP5

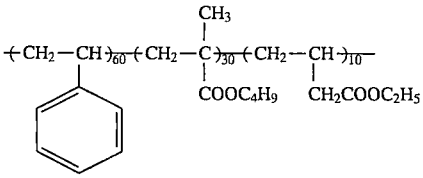

$\overline{M} = 300{,}000$

HP6

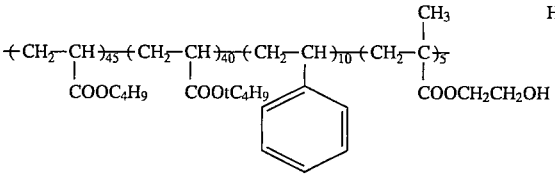

$\overline{M} = 500{,}000$

HP7

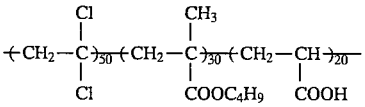

$\overline{M} = 200{,}000$

HP8

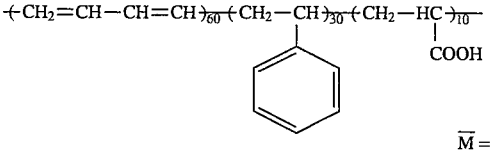

$\overline{M} = 600{,}000$

HP9

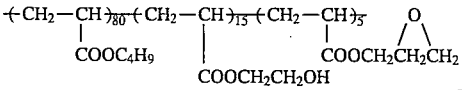

$\overline{M} = 150{,}000$

The following are exemplified compounds of (3) the reaction product of the hardening agent.

AH1

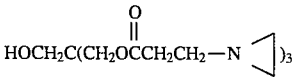

-continued
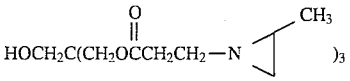
AH2
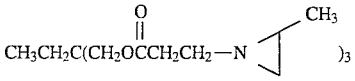
AH3
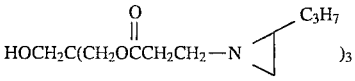
AH4
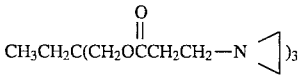
AH5
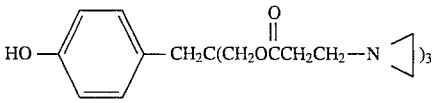
AH6
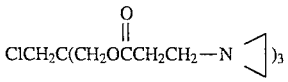
AH7
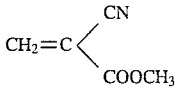
CH1
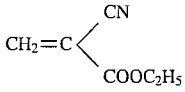
CH2
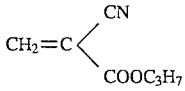
CH3
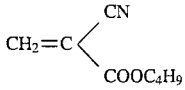
CH4
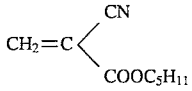
CH5
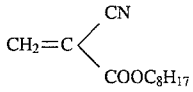
CH6
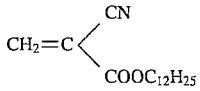
CH7
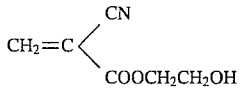
CH8
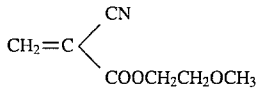
CH9
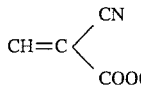
CH10
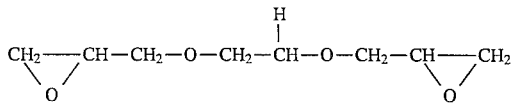
EH1

-continued

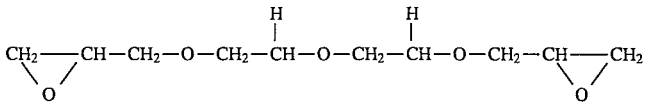

EH2

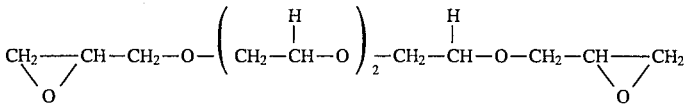

EH3

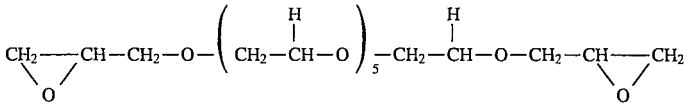

EH4

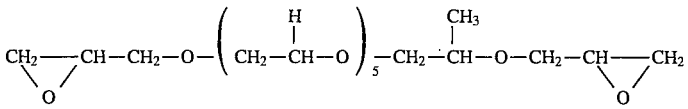

EH5

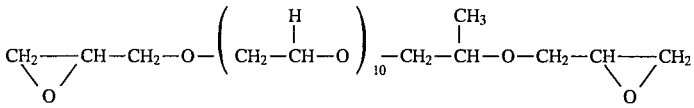

EH5

The above antistatic agent is coated either directly on or indirectly through a subbing layer on the support. For details reference can be made to JP O.P.I. No. 80744/1992.

The silver halide composition of the silver halide emulsion to be subjected to the chemical ripening of the invention may be any of, e.g., silver bromide, silver iodobromide and silver chloroiodobromide. The most preferred silver halide composition is a silver iodobromide emulsion containing not more than 30 mol % silver iodide.

The silver halide grain, as long as it is of the composition specified in the invention, may be of any crystal form such as octahedral or tetradecahedral single crystal, or multi-twin crystal grain having various forms.

The emulsion used in the silver halide photographic light-sensitive material of the invention may be prepared according to known, appropriate methods; for example, the method described in 'Emulsion Preparation and Types' in p.22–23 of Research Disclosure RD No. 17643 (Dec. 1978) or the method described in p.648 of RD No. 18716 (Nov. 1979).

The emulsion for the silver halide photographic light-sensitive material of the invention may also be prepared according to the method described in, e.g., T. H. James, 'The Theory of the Photographic Process,' 4th ed., Macmillan (1977) p.38–104; G. F. Duffin, 'Photographic Emulsion Chemistry,' Focal Press (1966); P. Glafkides, 'Chimie et Physique Photographique' Paul Montel (1967); or V. L. Zelikman et al, 'Making and Coating Photographic Emulsion,' Focal Press (1964).

Namely, the emulsion may be prepared under various conditions comprising in appropriate combination the use of specific solutions differing according to the acidic, ammoniacal or neutral method; mixing conditions differing according to the reverse precipitation process, double-jet process, controlled double-jet process, etc.; and grains growing conditions differing according to the conversion process or core/shell process.

The silver halide grains have an average grain diameter of 0.1 to 0.6 μm, and may be of either a monodisperse emulsion having a narrow grain diameter distribution or a polydisperse emulsion having a broad grain diameter distribution. The monodisperse emulsion herein implies a silver halide emulsion whose grain diameters' variation coefficient defined in JP O.P.I. No. 162244/1985 is not more than 0.20.

The monodisperse emulsion includes a silver halide emulsion comprising silver halide grains having an average grain diameter of not smaller than 0.1 μm, at least 95% by weight of which are grains whose diameters are within the range of its average grain diameter ±40%, and a silver halide emulsion comprising silver halide grains having an average grain diameter of 0.25 μm to 2 μm, at least 95% by weight of or at least 95% by number of which are silver halide grains whose diameters are within the range of its average grain diameter ±20%.

The above average grain diameter, in the case of a spherical silver halide grain, is its diameter, while in the case of a cubic or nonspherical grain, is the diameter of a circular image equivalent in the area to its projection image, and the average diameter is defined by the following equation:

Average grain diameter $=\Sigma n_i r_i/\Sigma n_i$ wherein $r_i$ represents each individual grain diameter, and $n_i$ represents the number of grain diameters.

Methods for preparation of the above monodisperse emulsion are known and detailed in J. Phot. Sci., 12. 242–251 (1963), JP O.P.I. No. 36890/1973, 16364/1977, 142329/1980 and 49938/–1983; British Patent No. 1,413,748; U.S. Pat. Nos. 3,574,628 and 3,655,394.

As the emulsion for the silver halide photographic light-sensitive material of the invention there may be used an emulsion prepared by a method for obtaining the above-mentioned monodisperse emulion, in which, e.g., seed crystals are used as growing nuclei, to which are supplied silver and halide ions to thereby grow silver halide grains.

The silver halide composition of the chemically unripened silver halide emulsion of the invention may be anyone of silver bromide, silver iodobromide, silver chloroiodobromide, and the like, and is preferably a silver iodobromide emulsion containing not more than 30 mol % silver iodide.

The chemically unripened silver halide grains have an average grain diameter of 0.8 μm to 2.0 μm and may be of either a monodisperse emulsion having a narrow grain diameter distribution or a polydisperse emulsion having a broad grain diameter distribution.

The silver halide grain, as long as it is of the composition specified in the invention, may be of any crystal form such as an octahedral or tetradecahedral single crystal, or multi-twin crystal having various forms.

The chemically unripened silver halide grain can be prepared in similar manner to the foregoing chemically ripened silver halide grain of the invention.

these compounds in the three RD publications are listed below:

| | RD-17643 | | RD-18716 | RD-308119 | |
|---|---|---|---|---|---|
| Additive | Page | Sec. | Page | Page | Sec. |
| Chemical sensitizers | 23 | III | 648 Upper right | 996 | III |
| Sensitizing dyes | 23 | IV | 648–649 | 996–8 | IV |
| Desensitizing dyes | 23 | IV | | 998 | B |
| Dyes | 25–26 | VIII | 649–650 | 1003 | VIII |
| Development accelerators | 29 | XXI | 648 Upper right | | |
| Antifoggants, stabilizers | 24 | IV | 649 Upper right | 1006–7 | VI |
| Brightening agents | 24 | V | | 998 | V. |
| Hardeners | 26 | X | 651 Left | 1004–5 | X |
| Surfactants | 26–27 | XI | 650 Right | 1005–6 | XI |
| Plasticizers | 27 | XII | 650 right | 1006 | XII |
| Sliding agents | 27 | XII | | | |
| Matting agents | 28 | XVI | 650 Right | 1008–9 | XVI |
| Binders | 26 | XXII | | 1003–4 | IX |
| Support materials | 28 | XVII | | 1009 | XVII |

The emulsion comprising the above chemically ripened silver halide and chemically unripened silver halide grains of the invention may be of a two-phase crystal grain structure with difference in the silver halide composition between the inside and the outside thereof. The most preferred embodiment of the emulsion is one comprising silver halide grains each having a substantially two-distinct-phase structure (core/shell-type structure) composed of a high-iodide core phase and a low-iodide shell phase.

The high-iodide core phase is a silver iodide-rich phase having a silver iodide content of preferably 20 to 40 mol %, more preferably 20 to 30 mol %.

The silver halide composition other than the silver iodide in the core phase may be any of silver bromide and silver chlorobromide, but is preferably silver chlorobromide having a high silver bromide content.

The outermost shell phase is silver halide containing preferably not more than 5 mol % and more preferably not more than 2 mol % silver iodide. The silver halide other than the silver iodide in the outermost phase may be any of silver chloride, silver bromide and silver chlorobromide, but is preferably a silver halide having a high silver bromide content.

The above core/shell-type emulsion may be prepared according to any of known methods therefor; for the preparation of it reference can be made to the methods described in J. Phot. Sci., 24–198 (1976); U.S. Pat. Nos. 2,592,250, 3,505,068, 4,210,450 and 4,444,877; and JP O.P.I. No. 143331/1985.

Removal of the soluble salts from the emulsion may be carried out by noodle washing method or flocculation sedimentation method. Preferred washing methods include a method which uses the aromatic hydrocarbon aldehyde resins containing a sulfo group described in JP E.P. No.16086/1960 and a desalting method which uses the exemplified compounds G-3, G-8, etc., as high-molecular flocculants described in JP O.P.I. No. 158644/–1988.

The emulsion for the silver halide photographic light-sensitive material of the invention may have various photographic additives added thereto in the process before or after the physical ripening or chemical ripening treatment thereof.

As the above additives there may be used those various compounds as described in RD Nos. 17643, 18716 and 308119 (Dec. 1989). The relevant pages and sections to Usable as the support for the silver halide photographic light-sensitive material of the invention are materials including those described in the above RD publications. A plastic film is suitable as the support, whose surface may be provided with a subbing layer or subjected to corona discharge treatment or UV irradiation treatment for the purpose of improving its adhesion property to a layer coated thereon.

The silver halide photographic light-sensitive material of the invention may have on the support thereof hydrophilic colloid layers comprising silver halide emulsion layers, protective layer, intermediate layers, filter layers, UV absorbing layer, antistatic layer, antihalation layer and backing layer.

In these hydrophilic colloid layers gelatin and various synthetic high-molecular compounds may be used as the binder or protective colloid thereof.

The above gelatin includes lime-treated gelatin, acid-treated gelatin and gelatin derivatives. The synthetic high-molecular materials other than gelatin include cellulose derivatives such as hydroxyethyl cellulose, and homo- or copolymers such as polyvinyl alcohol, polyvinyl alcohol partial acetal, poly-N-vinyl-pyrrolidone, polyacrylic acid, polyacrylamide, and the like.

The light-sensitive material of the invention may be photographically processed by using those processing solutions as described in the foregoing RD-17643, XX–XXI, p.29–30; or RD 308119, XX–XXI, p.1011–1012. The above processing used may be either a black-and-white processing to form a silver image or a color photographic processing to form a dye image. The processing is made normally at a temperature of from 18° C. to 50° C.

The developing agent used in the black-and-white processing includes dihydrobenzenes such as hydroquinone, 3-pyrazolidones such as 1-phenyl-3-pyrazolidone, aminophenols such as N-methyl-p-aminophenol and the like. These may be used alone or in combination. For the developer solution there may be used known additives such as preservative, alkali agent, pH buffer, antifoggant, hardener, development accelerator, surfactant, defoaming agent, toning agent, water softener, dissolution assistant, viscosity-providing agent, and the like.

The fixing solution contains a fixing agent such as a thiosulfate or a thiocyanate, and may further contain a hardener, e.g., a water-soluble aluminum salt such as aluminum sulfate or potassium alum. In addition, it may also contain a preservative, pH adjusting agent, water softener, and the like.

EXAMPLES

The invention is illutrated further in detail by the following examples, but the invention is not limited thereto.

Example 1

Preparation of chemically unripened emulsion

A silver iodobromide emulsion (silver iodide content: 2 mol %) having an average grain diameter of 0.3 μm was used as a seed emulsion, which was grown to prepare by an ammoniaca process a silver iodobromide monodisperse emulsion (silver iodide content: 3 mol %) having an average grain diameter of 0.7 to 2.2 μm, whose variation coefficient (σ/r) was within the range of from 0.15 to 0.20.

Preparation of Emulsions A and Ba

A silver iodobromide seed emulsion (silver iodide content: 2 mol %) having an average grain diameter of 0.1 μm was used to be grown by adding according to a double-jet process thereto an ammoniacal silver nitrate aqueous solution and a potassium bromide aqueous solution to thereby prepare a silver iodobromide cubic grains monodisperse emulsion (average silver iodide content: 0.4 mol %) having an average grain diameter of 0.25 μm, whose variation coefficient (σ/r) was 0.17.

This emulsion was divided into two parts; one was dissolved immediately before its chemical ripening, and to it, when its temperature became constant, were added the following dye (1) to prepare Emulsion (A) while to the other was added the following dye (2) to prepare Emulsion (B). The used amount of each dye was 90 mg per mol of silver halide. Subsequently, each emulsion was subjected to chemical sensitization treatment by adding ammonium thiocyanate, chloroauric acid and hypo thereto, and then further added 4-hydroxy-6-methyl-1,3,3a,7-tetrazaindene.

Dye (1)

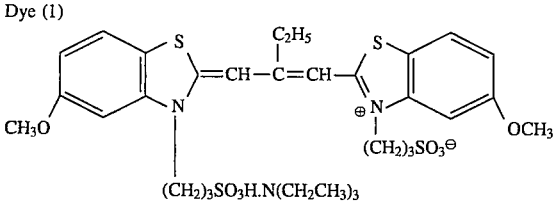

Dye (2)

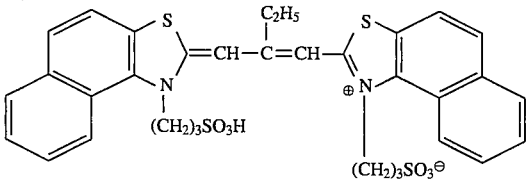

Backing layer

Backing subbing layer:

| | |
|---|---|
| Gelatin | 400 g |
| Sodium i-amine-n-decylsulfosuccinate | 0.4 g |
| Antihalation dye (1) | 10 g |
| Diethylene glycol | 5.0 g |
| Glyoxal | 2.0 g |
| Dye emulsified dispersion (shown below) | 33 g |
| Antihalation dye (1) | |

-continued

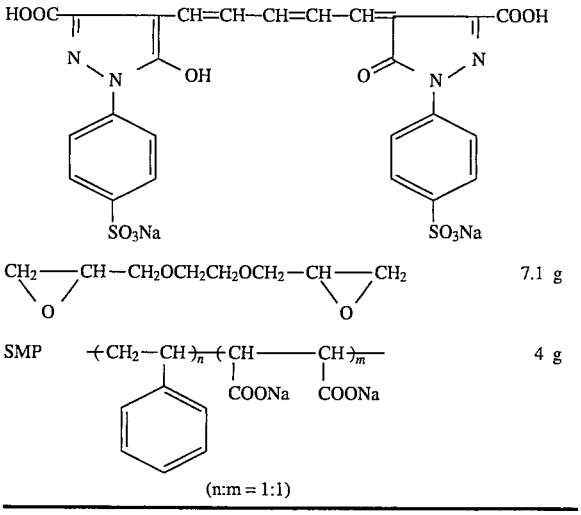

Water is added to make the whole 7 liters.

Preparation of dye emulsified dispersion

Ten kilograms of the following dye were dissolved at 55° C. in a solvent mixture of 28 liters of tricresyl phosphate and 85 liters of ethyl acetate; the obtained solution was referred to as an oil solution. On the other hand, 270 liters of an aqueous 9.3% gelatin solution containing 1.35 kg of an anionic surface active agent (AS) were prepared; it was referred to as an aqueous solution. Then, the oil solution and the aqueous solution were put in a dispersing kettle and dispersed while keeping the liquid's temperature at 40° C. After adding appropriate amounts of phenol and 1,1'-dimethylol-1-bromo-1-nitromethane to the obtained dispersion, water was added to it to make the whole 240 kg.

Dye

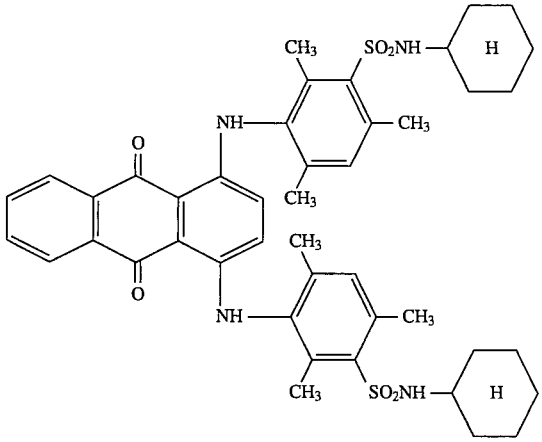

AS

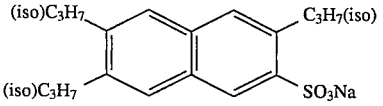

Backing upper layer coating liquid:

| | |
|---|---|
| Gelatin | 400 g |
| Sodium i-amyl-n-decylsulfosuccinate | 10 g |
| Antihalation dye (1) | 10 g |

-continued

| | |
|---|---|
| Polymethyl methacrylate | 12 g |
| SAM-1 | 3.0 g |
| SAM-2 | 0.75 g |
| Stergent 100 (product of Neos Co.) | 0.3 g |
| SMP | 2.0 g |
| Glyoxal | 13.6 g |

SAM-1

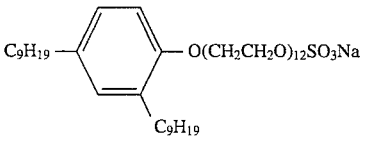

SAM-2

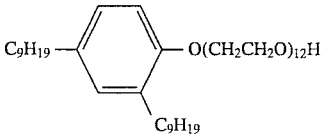

Water was added to make 7 liters.

Red-sensitive silver halide emulsion layer coating liquids

The above Emulsions A and B and the chemically unripened emulsion were mixed in the ratios by weight shown in Table 1, and then the following materials were added in the following described amounts per mol of silver halide, whereby red-sensitive silver halide emulsion coating liquids were prepared.

| | |
|---|---|
| Trimethylol propane | 10 g |
| Nitrophenyl-triphenylphosphonium chloride | 50 mg |
| Ammonium 1,3-dihydroxybenzene-4-sulfonate | 1 g |
| Sodium 2-mercaptobenzimidazole-5-sulfonate | 10 mg |
| 1,1-Dimethylol-1-bromo-1-nitromethane | 10 mg |
| 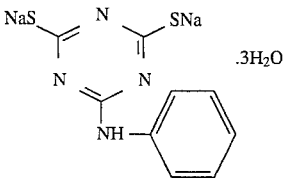 | 30 mg |
| $C_4H_9OCH_2CH(OH)CH_2N(CH_2COOH)_2$ | 1 g |
| 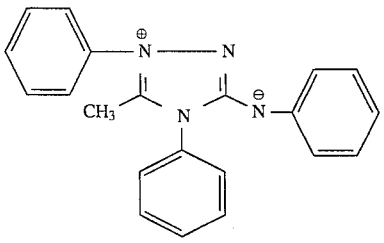 | 100 mg |
| 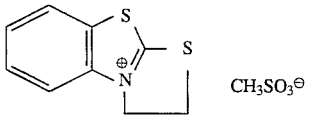 | 35 mg |

Emulsion-side protective layer coating liquid

A solution of the following constituents, shown in adding amounts per liter of the coating liquid,

| | |
|---|---|
| Lime-treated inert gelatin | 68 g |
| Acid-treated gelatin | 2 g |
| Sodium i-amyl-n-decylsulfosuccinate | 1.4 g |
| Polymethyl methacrylate (particle diamter: 4 μm) | Shown in Table 1 |
| Silicon dioxide particles (area average particle diameter: 1.2 μm) | 0.5 g |
| Ludox AM (colloidal silica, produced by DuPont Co.) | 30 g |
| Sodium 2,4-dichloro-6-hydroxy-1,3,5-triazine (2% aqueous solution) | 10 ml |
| Formalin (35%) | 2 ml |
| Glyoxal (40%) | 5 ml |
| Stergent 100 | 60 mg |
| $C_8F_{17}SO_3K$ | 180 mg |
| Topcide 300 (produced by Permchem Asia Ltd.) | 45 mg |
| SAM-1 | 1.0 g |
| SAM-2 | 0.4 g |
| $NaO_3S-CH(CH_2COOCH_2(CF_2)_6H)-CH_2COOCH_2(CF_2)_6H$ | 0.5 g |
| $C_{11}H_{23}CONH(CH_2CH_2O)_5H$ | 2.5 g |

Preparation of support

A polyethylene terephthalate support of 180 μm in thickness was subjected to biaxial stretching/thermal setting treatment, and then both sides of it were subjected to corona discharge treatment. After that, on the support was formed a subbing layer by coating a latex (compound of synthesis example 1) that is described in the Example 1 of JP O.P.I. No. 18945/1984.

Subsequently, on one side of the above support was coated an antistatic layer comprising the following compound that is described in JP O.P.I. No. 80744/1992, filed for by the same applicant as for the present invention.

Water-soluble conductive polymer (Exemplified compound P4) 0.6 g/m$^2$

Hydrophobic polymer (Exemplified compound HP1) 0.5 g/m$^2$

Hardening agent (Exemplified compound AH5) $2\times10^{-3}$ mol/dm$^2$

The above materials were coated at a rate of 30 meters per minute by a roll-fit-coating pan/air knife coating process, and then was again activated by corona discharge in like manner, whereby an objective support was obtained.

Coating of samples

The foregoing silver halide Emulsions A and B of the invention and the emulsion protective layer coating liquid were coated on the antistatic layer-free side of the obtained support.

The foregoing backing lower and upper layers were coated on the antistatic layer-coated side of the support.

Slide-hopper simultaneous coatings of both upper and lower layers of the backing layer were made so as to have gelatin coating weights of 3.0 g/m$^2$ and 1.2 g/m$^2$, respectively. Other coatings were made so as to provide gelatin coating weights of 2.4 g/m$^2$ for the emulsion layer and 1.2 g/m$^2$ for the protective layer. As for the silver coating weight, coatings were made as shown in Table 1.

The obtained samples were evaluated as follows.

Evaluation items and methods (1) Glossiness:

Each sample was exposed to a tungsten light to the extent that it should reach maximum density, and processed for 45 seconds in an autoprocessor SRX-501, manufactured by KONICA Corp., and then the degree of the surface gloss on the emulsion side of the processed sample was measured at a light-incident angle of 20° with a digital conversion glossimeter VG-ID, manufactured by Nippon Denshoku Industry Co., and from the measured values obtained, evaluations were made as follows:

Less than 20: Very weak gloss 20 to less than 25: Weak gloss 25 to less than 30: Acceptable gloss for practical use 30 to less than 35: Strong gloss 35 and upwards: Very strong gloss (2) Legibility of characters:

The following five-rank evaluation was made on each sample from the legibilities of the numerical characters in SMPT pattern reproduced on it by KONICA Laser Imager LI-10, manufactured by KONICA Corp.

1: Very poor

2: Poor

3: No problem for practical use

4: Good

5: Excellent (3) Haze (evaluation of transparency):

Each sampl, remaining unexposed, was processed for 45 seconds in SRX-501, and then its haze was measured with a turbidimeter MODEL-T-2600DA, manufactured by Tokyo Denshoku Co., and then evaluated according to the following criteria:

15 to less than 20: Poor 10 to less than 15: No problem for practical use 5 to less than 10: Good (4) Scratches by pressure (unexposed):

They appear on the unexposed samples processed in the same manner as in the above haze-evaluation samples. Conditions of roller marks attributable to the autoprocessor's roller pressure were visually examined for evaluation.

The results were subjected to the following five-rank evaluation.

1: Very poor

2: Poor

3: No problem for practical use

4: Good

5: Excellent (5) Fixability:

The fixing trouble of each unexposed sample (residue of silver halide) was visually examined for evaluation.

The fixability of each sample was subjected to the following four-rank evaluation.

1: Very poor

2: Poor

3: No problem for practical use

4: Good

The obtained results were collectively listed in Table 1.

TABLE 1

| | Chemically unripened emulsion | | Chemically ripened emulsion | | | Ag coat- | Polymethyl methacryl- ate | | Char- | | Scra- tches | |
|---|---|---|---|---|---|---|---|---|---|---|---|---|
| Sample No. | Grain diamet- er(μm) | Con- tent (%) | No. | Grain diamet- er(μm) | Con- tent (%) | ing wt (g/m$^2$) | added amount (mg/m$^2$) | Degree of gloss | acter legi- bility | Haze | by pres- sure | Fix- abil- ity |
| 1 (Comp.) | — | — | A | 0.25 | 100 | 3.6 | 25 | 30 | 2 | 5 | 5 | 2 |
| 2 (Comp.) | — | — | " | " | " | 3.4 | " | 40 | 2 | 5 | 4 | 3 |
| 3 (Comp.) | — | — | " | " | " | 3.2 | " | 45 | 2 | 5 | 4 | 4 |
| 4 (Comp.) | — | — | " | " | " | 2.7 | " | 46 | 2 | 5 | 4 | 4 |
| 5 (Comp.) | — | — | " | " | " | " | 50 | 43 | 2 | 7 | 4 | 4 |
| 6 (Comp.) | — | — | " | " | " | " | 90 | 40 | 2 | 10 | 4 | 4 |
| 7 (Comp.) | — | — | " | " | " | " | 120 | 35 | 2 | 16 | 4 | 4 |
| 8 (Comp.) | 0.7 | 10 | " | " | 90 | 3.0 | 25 | 37 | 2 | 5 | 4 | 4 |
| 9 (Inv.) | 0.9 | " | " | " | " | " | " | 23 | 4 | 5 | 4 | 4 |
| 10 (Inv.) | 1.0 | " | " | " | " | " | " | 20 | 4 | 5 | 4 | 4 |
| 11 (Inv.) | 1.5 | " | " | " | " | " | " | 19 | 4 | 6 | 4 | 4 |
| 12 (Inv.) | 1.9 | " | " | " | " | " | " | 18 | 4 | 6 | 4 | 4 |
| 13 (Comp.) | 2.2 | " | " | " | " | " | " | 18 | 2 | 9 | 4 | 4 |
| 14 (Comp.) | 1.0 | 3 | " | " | 97 | " | " | 40 | 2 | 5 | 4 | 4 |
| 15 (Inv.) | " | 6 | " | " | 93 | " | " | 28 | 3 | 5 | 4 | 4 |
| 16 (Inv.) | " | 15 | " | " | 85 | " | " | 18 | 4 | 6 | 4 | 4 |
| 17 (Inv.) | " | 25 | " | " | 75 | " | " | 17 | 4 | 8 | 3 | 4 |
| 18 (Comp.) | " | 35 | " | " | 65 | " | " | 17 | 3 | 13 | 2 | 3 |
| 19 (Comp.) | — | — | B | " | 100 | 2.7 | " | 48 | 2 | 5 | 4 | 4 |
| 20 (Inv.) | 1.0 | 10 | " | " | 90 | 3.0 | " | 20 | 4 | 5 | 4 | 4 |
| 21 (Comp.) | " | " | A | " | 90 | " | — | 35 | 3 | 5 | 4 | 4 |
| 22 (Comp.) | " | 25 | " | " | 75 | " | — | 32 | 3 | 6 | 3 | 4 |

As is apparent from Table 1, according to the present invention, there can be obtained a silver halide photographic light-sensitive material having a restrained surface gloss, an improved character legibility, no roller marks trouble and excellent transparency, free of fixing trouble.

Example 2

Samples were prepared in the same manner as in Exemple 1 except that the grain diameter of the chemically ripened silver halide grains was changed to 0.3 μm, and the spectral sensitizing dye was replaced by Dye (2).

Also the sample preparation and evaluation were carried out in the same manner as in Example 1 except that the writing of SMPT pattern for the character legibility evaluation was made by a laser imager with use of 820 nm semiconductor laser, and the results are shown in Table 2.

TABLE 2

| Sample No. | Chemically unripened emulsion: Grain diameter(μm) | Chemically unripened emulsion: Content (%) | Chemically ripened emulsion: No. | Chemically ripened emulsion: Grain diameter(μm) | Chemically ripened emulsion: Content (%) | Ag coating wt (g/m²) | Polymethyl methacrylate added amount (mg/m²) | Degree of gloss | Character legibility | Haze | Scratches by pressure | Fixability |
|---|---|---|---|---|---|---|---|---|---|---|---|---|
| 23 (Comp.) | — | — | C | 0.3 | 100 | 2.7 | 25 | 40 | 2 | 5 | 4 | 4 |
| 24 (Comp.) | — | — | " | " | " | 3.0 | " | 37 | 2 | 5 | 4 | 4 |
| 25 (Inv.) | 1.0 | 5 | " | " | 95 | " | " | 28 | 3 | 5 | 4 | 4 |
| 26 (Inv.) | " | 10 | " | " | 90 | " | " | 20 | 4 | 5 | 4 | 4 |
| 27 (Inv.) | " | 15 | " | " | 85 | " | " | 18 | 4 | 6 | 4 | 4 |

From Table 2 it is apparent that even if the chemically ripened emulsion grain size is grown larger and the spectral sensitizing dye is changed, there can be obtained a silver halide photographic light-sensitive material having as good character legibility as that in Example 1 according to the invention.

What is claimed is:

1. A silver halide photographic light-sensitive material for laser beam scanning use, comprising a support and a silver halide emulsion layer on one side of said support, which layer having a silver coating weight of not more than 3.5 g/m², and at least one polymer matting agent on the silver halide emulsion layer side of said support, wherein the silver halide emulsion layer comprises chemically unripened silver halide grains having an average grain diameter of 0.8 μm to 2.0 μm and chemically ripened silver halide grains having an average grain diameter of 0.1 μm to 0.6 μm in a ratio of 30:70 to 5:95.

2. The silver halide photographic light-sensitive material of claim 1, wherein the silver halide emulsion layer comprises chemically unripened silver halide grains having an average grain diameter of 0.9 μm to 1.2 μm and chemically ripened silver halide grains having an average grain diameter of 0.15 μm to 0.40 μm in a ratio of 30:70 to 5:95.

3. The silver halide photographic light-sensitive material of claim 1, wherein the silver halide emulsion layer comprises chemically unripened silver halide grains having an average grain diameter of 0.9 μm to 1.2 μm and chemically ripened silver halide grains having an average grain diameter of 0.15 μm to 0.40 μm in a ratio of 20:80 to 5:95.

4. The silver halide photographic light-sensitive material of claim 1, wherein the silver coating weight is within the range of 2.0 to 3.3 g/m².

5. The silver halide photographic light-sensitive material of claim 1, wherein the polymer matting agent is selected from the group consisting of polyacrylate, polymethyl methacrylate, cellulose acetate propionate and polystyrene and wherein the polymer matting agent has an average diameter of 0.5 μm to 7.0 μm.

6. The silver halide photographic light-sensitive material of claim 1, wherein the polymer matting agent is contained in an amount of 10 to 100 mg/m².

7. The silver halide photographic light-sensitive material of claim 6, wherein the matting agent is contained in a layer selected from the group consisting of an emulsion layer, a non-emulsion layer and a protective layer.

8. The silver halide photographic light-sensitive material of claim 1, wherein the material is spectral sensitized to the wavelength region of not less than 600 nm, and the material comprises a spectral sensitizing dye represented by Formulae 1, 2 or 3:

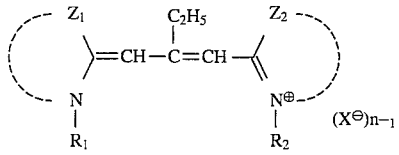

wherein $Z_1$ and $Z_2$ each represents a group of non-metallic atoms necessary to form an azole ring which may have a substituent selected from an alkoxyl group, a hydroxyl group, a chloro atom or a hydrogen atom; $R_1$ and $R_2$ each represents an alkyl group or a sulfopropyl group, a sulfobutyl group, a sulfonatopropyl group or a sulfonatobutyl group; $X^-$ is a counter ion; and n is an integer of 1 or 2, provided that n is 1 when an intramolecular salt is formed,

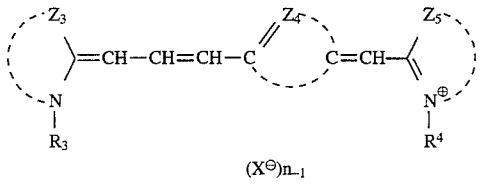

wherein $Z_3$ and $Z_5$ each represents a group of non-metallic atoms necessary to form a benzothiazole ring, a naphthothiazole ring, a benzoxazole ring or a naphthoxazole ring, each of which may have a substituent; $Z_4$ represents a moiety necessary to form a 5- or 6-membered carbocyclic ring selected from a

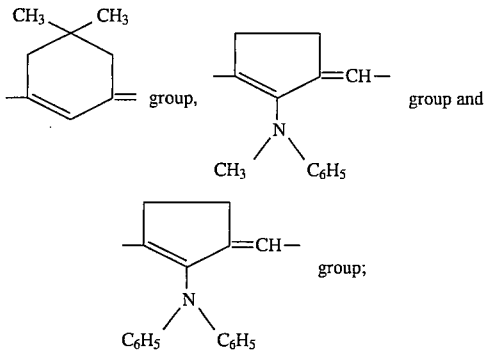

$R_3$ and $R_4$ each represents an alkyl group or a carboxymethyl group; $X^-$ is a counter ion; and n is an integer of 1 or 2, provided that n is 1 when an intramolecular salt is formed,

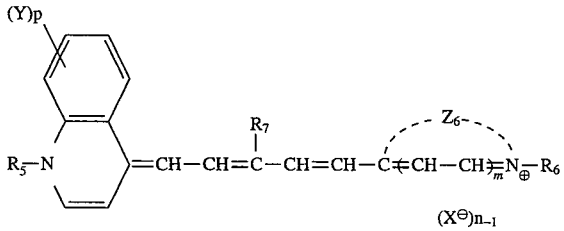

wherein $R_5$ and $R_6$ each represents an alkyl group; $R_7$ is a hydrogen atom, an alkyl group, an alkoxy group, a phenyl group or a benzyl group; Y is a hydrogen atom, an alkyl group having 1 to 8 carbon atoms, an alkoxy group or a halogen atom; $Z_6$ represents a moiety necessary to form a 5- or 6-membered nitrogen containing heterocyclic group; $X^-$ is a counter ion; and m, n and p are each an integer of 1 or 2.

9. A silver halide photographic light-sensitive material for laser beam scanning use, comprising a support and a silver halide emulsion layer on one side of said support, which layer having a silver coating weight of 2.0 to 3.3 g/m$^2$, and at least one polymer matting agent on the silver halide emulsion layer side of the support, wherein the silver halide emulsion layer comprises chemically unripened silver halide grains having an average grain diameter of 0.9 μm to 1.2 μm and chemically ripened silver halide grains having an average grain diameter of 0.15 μm to 0.40 μm in a ratio of 20:80 to 5:95.

* * * * *